United States Patent
Liu et al.

(10) Patent No.: US 11,273,806 B2
(45) Date of Patent: Mar. 15, 2022

(54) ENHANCED COLLISION MITIGATION

(71) Applicant: Ford Global Technologies, LLC, Dearborn, MI (US)

(72) Inventors: Yuhao Liu, Canton, MI (US); Christopher Pontisakos, Allen Park, MI (US); Steven Joseph Szwabowski, Northville, MI (US); Alex Maurice Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 286 days.

(21) Appl. No.: 16/655,598

(22) Filed: Oct. 17, 2019

(65) Prior Publication Data
US 2021/0114565 A1 Apr. 22, 2021

(51) Int. Cl.
*B60T 7/22* (2006.01)
*B60T 8/172* (2006.01)
*B60T 8/58* (2006.01)

(52) U.S. Cl.
CPC ............... *B60T 7/22* (2013.01); *B60T 8/172* (2013.01); *B60T 8/58* (2013.01); *B60T 2250/00* (2013.01); *B60T 2250/03* (2013.01)

(58) Field of Classification Search
CPC ...... B60T 8/58; B60T 8/172; B60T 2201/022; B60T 2201/16; B60T 2250/00; B60T 2250/03; B60T 7/22
USPC .......................................................... 701/70
See application file for complete search history.

(56) References Cited

U.S. PATENT DOCUMENTS

| 7,124,027 | B1 * | 10/2006 | Ernst, Jr. ............... | G01S 13/931 |
| | | | | 701/301 |
| 9,688,273 | B2 | 6/2017 | Mudalige et al. | |
| 9,751,506 | B2 | 9/2017 | Mudalige et al. | |
| 10,232,849 | B2 | 3/2019 | Liu et al. | |
| 11,210,744 | B2 * | 12/2021 | Shalev-Shwartz ..... | G06Q 40/08 |

(Continued)

FOREIGN PATENT DOCUMENTS

| CN | 106608263 A | * 5/2017 | ........... G01S 13/931 |
| CN | 108692699 A | * 10/2018 | ........... B60W 30/09 |

(Continued)

OTHER PUBLICATIONS

Press et al., "Numerical Recipes—The Art of Scientific Computing—Third Edition", © Cambridge University Press, www.cambridge.org.

*Primary Examiner* — Atul Trivedi
(74) *Attorney, Agent, or Firm* — Frank A. MacKenzie; Bejin Bieneman PLC

(57) ABSTRACT

A computer includes a processor and a memory, the memory storing instructions executable by the processor to identify an initial lateral distance and an initial longitudinal distance of a host vehicle in a turn at an initiation of the turn, predict a heading angle of the host vehicle at a specified time after the initiation of the turn, predict a final lateral distance and a final longitudinal distance between the host vehicle and a target at the specified time based on the identified lateral distance, the identified longitudinal position, and the predicted heading angle, determine a lateral offset at a longitudinal time to collision based on the final lateral distance and the final longitudinal distance, and actuate a brake of the host vehicle according to a threat assessment based on the lateral offset.

20 Claims, 4 Drawing Sheets

(56) References Cited

U.S. PATENT DOCUMENTS

| | | | |
|---|---|---|---|
| 2003/0191568 A1* | 10/2003 | Breed | B60W 40/06 701/36 |
| 2005/0060069 A1* | 3/2005 | Breed | G08G 1/164 701/408 |
| 2012/0212353 A1* | 8/2012 | Fung | B60W 10/18 340/905 |
| 2013/0231825 A1* | 9/2013 | Chundrlik, Jr. | G01P 3/50 701/29.1 |
| 2015/0153735 A1* | 6/2015 | Clarke | G06T 7/285 701/301 |
| 2018/0037227 A1* | 2/2018 | D'sa | B60W 50/045 |
| 2018/0050673 A1* | 2/2018 | D'sa | B60T 7/22 |
| 2018/0204460 A1 | 7/2018 | Deng et al. | |
| 2018/0208186 A1* | 7/2018 | Liu | B60W 30/09 |
| 2019/0071098 A1* | 3/2019 | Asakura | B60W 30/09 |
| 2019/0232958 A1* | 8/2019 | Deng | G01S 13/931 |
| 2019/0243371 A1* | 8/2019 | Nister | G05D 1/0278 |
| 2019/0258251 A1* | 8/2019 | Ditty | G06K 9/00805 |
| 2019/0286137 A1* | 9/2019 | Matsunaga | G05D 1/0088 |
| 2021/0061241 A1* | 3/2021 | Liu | B60T 7/22 |
| 2021/0094577 A1* | 4/2021 | Shalev-Shwartz | G06T 7/20 |
| 2021/0110484 A1* | 4/2021 | Shalev-Shwartz | B60W 30/0953 |

FOREIGN PATENT DOCUMENTS

| | | | | |
|---|---|---|---|---|
| CN | 112677962 A | * | 4/2021 | B60T 8/58 |
| DE | 102020100083 A1 | * | 7/2020 | B60W 30/08 |
| DE | 102020103341 A1 | * | 8/2020 | B60W 30/0956 |
| IL | 268393 A | * | 9/2019 | |
| IL | 284500 A | * | 8/2021 | |
| TW | 202132803 A | * | 2/2020 | |
| TW | 202132810 A | * | 2/2020 | |
| WO | WO-2019012921 A1 | * | 1/2019 | G08G 1/16 |
| WO | WO-2019218097 A1 | * | 11/2019 | B60C 23/04 |
| WO | WO-2021050745 A1 | * | 3/2021 | G08G 1/166 |

\* cited by examiner

ENHANCED COLLISION MITIGATION

BACKGROUND

Vehicle collisions can occur at roadway intersections. Collision avoidance systems use sensors to detect a target that can collide with a host vehicle in the intersection. These systems can detect a target object position and speed to determine a probability of a collision with the host vehicle.

DETAILED DESCRIPTION

Figure 1:
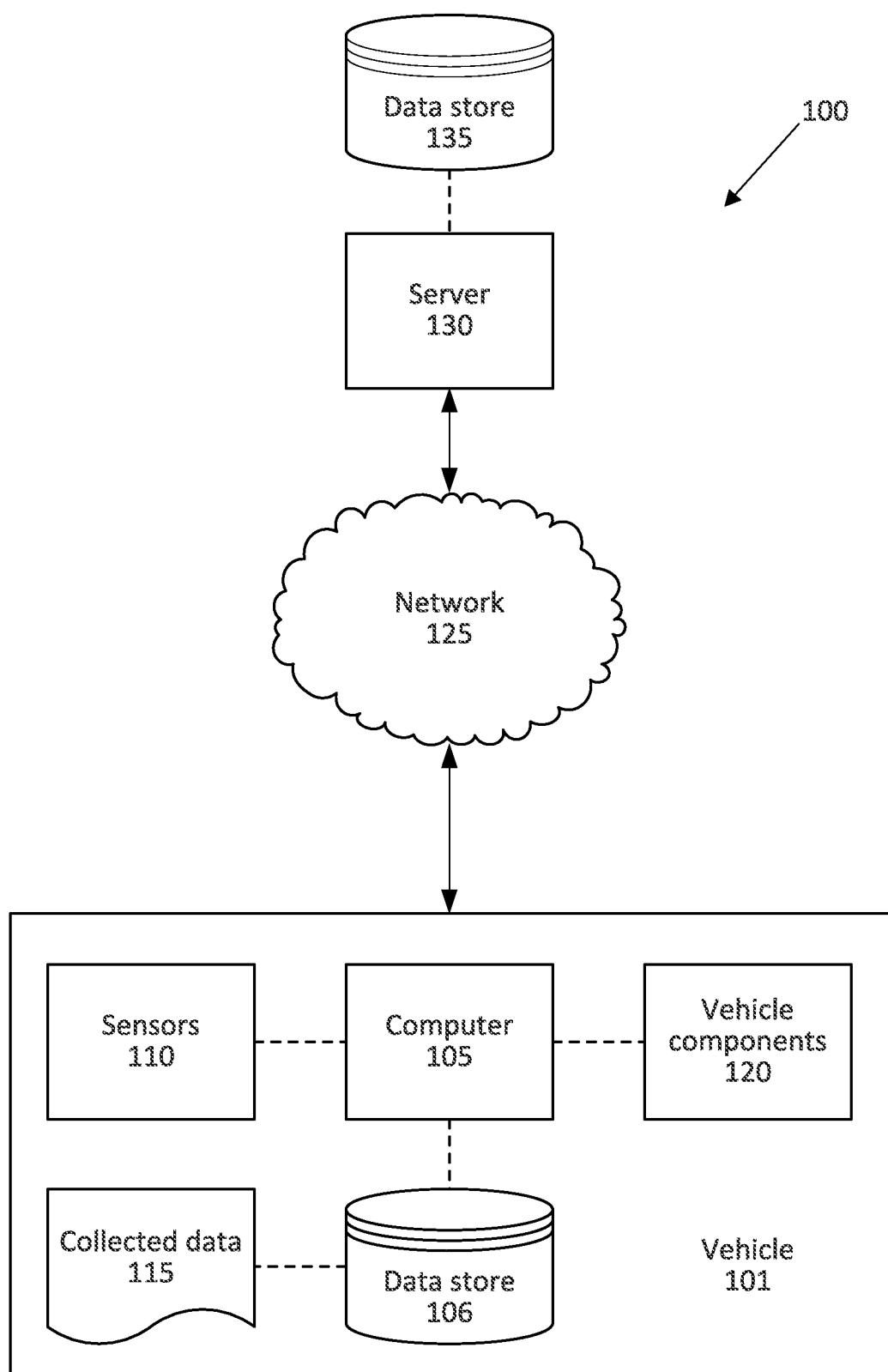
FIG. 1 is a block diagram of an example system for collision mitigation.

A system includes a computer including a processor and a memory, the memory storing instructions executable by the processor to identify an initial lateral distance and an initial longitudinal distance of a host vehicle in a turn at an initiation of the turn, predict a heading angle of the host vehicle at a specified time after the initiation of the turn, predict a final lateral distance and a final longitudinal distance between the host vehicle and a target at the specified time based on the identified lateral distance, the identified longitudinal position, and the predicted heading angle, determine a lateral offset at a longitudinal time to collision based on the final lateral distance and the final longitudinal distance, and actuate a brake of the host vehicle according to a threat assessment based on the lateral offset.

The instructions can further include instructions to determine the threat assessment based on a brake delay time of the brake of the host vehicle.

The instructions can further include instructions to determine a second threat assessment based on a target speed and to actuate the brake according to the lower of the threat assessment and the second threat assessment.

The instructions can further include instructions to adjust the threat assessment based on the lateral offset when the longitudinal time to collision is below a time threshold.

The instructions can further include instructions to adjust the threat assessment based on the lateral offset and the longitudinal time to collision.

The initial lateral distance and the initial longitudinal distance of the host vehicle can be a lateral distance and a longitudinal distance between a center point of a front bumper of the host vehicle and the target, and the instructions can further include instructions to identify a second lateral distance between a center point of a rear axle of the host vehicle and the target and a second longitudinal distance between the center point of the rear axle of the host vehicle and the target based on the lateral distance and the longitudinal distance of the center point of the front bumper of the host vehicle.

The instructions can further include instructions to predict a third lateral distance between the center point of the rear axle and the target at the specified time and a third longitudinal distance between the center point of the rear axle and the target at the specified time based on the second lateral distance and the second longitudinal distance.

The instructions can further include instructions to predict a fourth lateral distance between the center point of the rear axle and the target and a fourth longitudinal distance between the center point of the rear axle and the target based on the predicted heading angle, the third lateral distance, and the third longitudinal distance.

The instructions can further include instructions to predict the final lateral distance based on the fourth lateral distance and the final longitudinal distance based on the fourth longitudinal distance.

The instructions can further include instructions to adjust the threat assessment based on the lateral offset and a width of the host vehicle.

The instructions can further include instructions to suppress the threat assessment when the longitudinal time to collision exceeds a time threshold.

The instructions can further include instructions to determine the final lateral distance and the final longitudinal distance in a vehicle coordinate system rotated by the predicted heading angle.

The instructions can further include instructions to predict the heading angle of the host vehicle based on a yaw rate of the host vehicle.

The predicted heading angle can be an angle defined between a longitudinal axis of a vehicle coordinate system at the initiation of the turn and a longitudinal axis of a second vehicle coordinate system at the specified time.

A method includes identifying an initial lateral distance and an initial longitudinal distance of a host vehicle in a turn at an initiation of the turn, predicting a heading angle of the host vehicle at a specified time after the initiation of the turn, predicting a final lateral distance and a final longitudinal distance between the host vehicle and a target at the specified time based on the identified lateral distance, the identified longitudinal position, and the predicted heading angle, determining a lateral offset at a longitudinal time to collision based on the final lateral distance and the final longitudinal distance, and actuating a brake of the host vehicle according to a threat assessment based on the lateral offset.

The method can further include determining the threat assessment based on a brake delay time of the brake of the host vehicle.

The method can further include determining a second threat assessment based on a target speed and actuating the brake according to the lower of the threat assessment and the second threat assessment.

The method can further include adjusting the threat assessment based on the lateral offset when the longitudinal time to collision is below a time threshold.

The method can further include adjusting the threat assessment based on the lateral offset and the longitudinal time to collision.

The initial lateral distance and the initial longitudinal distance of the host vehicle can be a lateral distance and a longitudinal distance between a center point of a front bumper of the host vehicle and the target, and the method can further include identifying a second lateral distance between a center point of a rear axle of the host vehicle and the target and a second longitudinal distance between the center point of the rear axle of the host vehicle and the target based on the lateral distance and the longitudinal distance of the center point of the front bumper of the host vehicle.

The method can further include predicting a third lateral distance between the center point of the rear axle and the target at the specified time and a third longitudinal distance between the center point of the rear axle and the target at the specified time based on the second lateral distance and the second longitudinal distance.

The method can further include predicting a fourth lateral distance between the center point of the rear axle and the target and a fourth longitudinal distance between the center point of the rear axle and the target based on the predicted heading angle, the third lateral distance, and the third longitudinal distance.

The method can further include predicting the final lateral distance based on the fourth lateral distance and the final longitudinal distance based on the fourth longitudinal distance.

The method can further include adjusting the threat assessment based on the lateral offset and a width of the host vehicle.

The method can further include suppressing the threat assessment when the longitudinal time to collision exceeds a time threshold.

The method can further include determining the final lateral distance and the final longitudinal distance in a vehicle coordinate system rotated by the predicted heading angle.

The method can further include predicting the heading angle of the host vehicle based on a yaw rate of the host vehicle.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Detecting a predicted lateral offset between a host vehicle and a target in a coordinate system rotated according to a predicted heading angle of the host vehicle allows for a collision threat assessment that accounts for movement of the host vehicle in a turn. That is, when the host vehicle performs a turn, the coordinate system of the host vehicle rotates, and respective lateral and longitudinal distances between the host vehicle and the target change according to the rotation of the host vehicle. Considering the distance between the host vehicle and the target to determine the threat assessment reduces false positive identifications of targets that may collide with the host vehicle and adds the functionality for stationary target by providing an additional threat number (i.e., a numerical evaluation of a risk of collision) to consider with position-based and velocity-based threat numbers.

FIG. 1 illustrates an example system 100 for collision mitigation. A computer 105 in a host vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
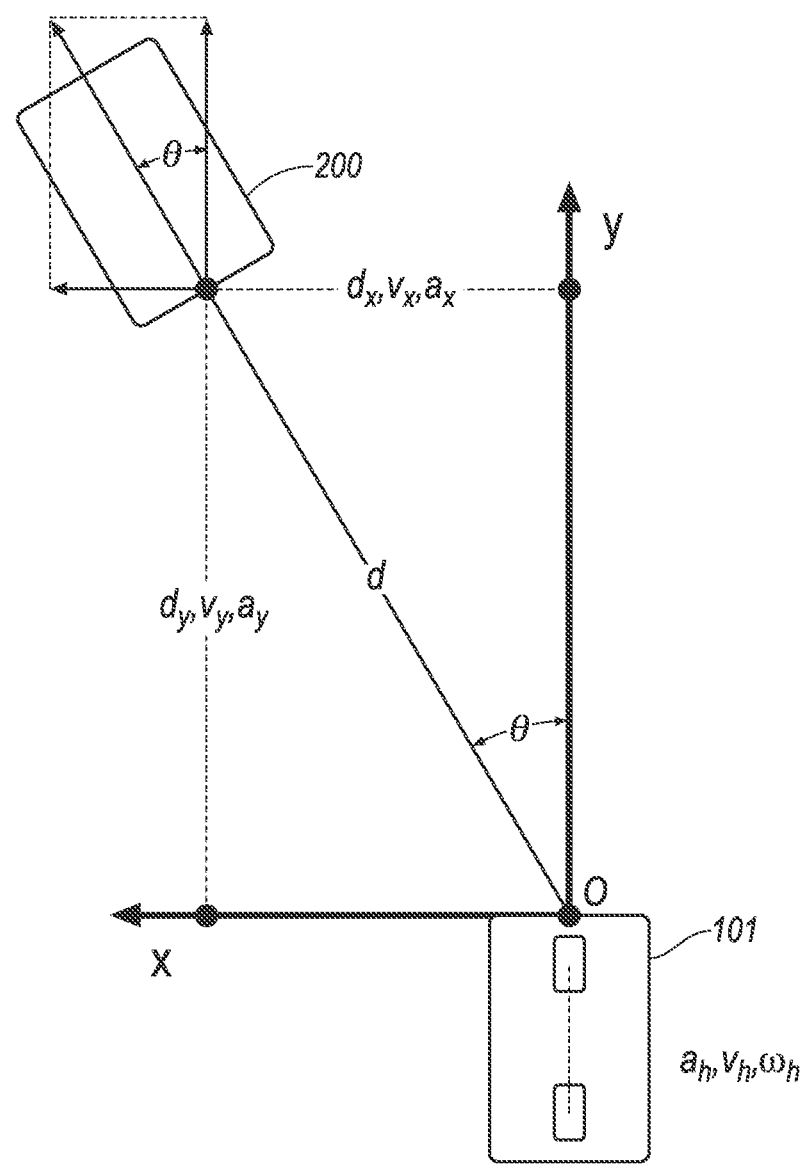
FIG. 2 is a plan view of a host vehicle and a target vehicle.

FIG. 2 is a plan view of a host vehicle 101 and a target 200. The target 200 is an object that can collide with the host vehicle 101, e.g., another vehicle 101, a pedestrian, etc. The host vehicle 101 defines a coordinate system, e.g., a two-dimensional rectangular coordinate system. The coordinate system defines a lateral axis x and a longitudinal axis y extending from an origin O at a center point of a front bumper of the host vehicle 101. The longitudinal axis y extends along vehicle-forward direction, i.e., the direction in which a propulsion 120 moves the vehicle 101 when a steering component 120 is at a neutral position. The lateral axis x extends perpendicular to the longitudinal axis y.

The host vehicle 101 can perform a turn, i.e., can move from a current position to a final position during which the host vehicle 101 rotates substantially perpendicular to the current position. The coordinate system defined at the initiation of the turn is the "original" coordinate system, as used herein. A coordinate system defined during the turn is a "rotated" coordinate system.

The computer 105 can determine a lateral distance $d_x$ and a longitudinal distance $d_y$ between the host vehicle 101 and the target 200. The lateral distance $d_x$ is the distance along the x axis between the host vehicle 101 and the target 200. The longitudinal distance $d_y$ is the distance along the longitudinal axis y between the host vehicle 101 and the target 200. The computer 105 can determine the distances $d_x$, $d_y$ by collecting data 115 from one or more sensors 110 about the target 200. For example, the computer 105 can actuate one or more cameras 110 to collect image data 115, can process the image data 115 with a conventional algorithm (e.g., Canny edge detection) to identify the target 200, and can determine the distances $d_x$, $d_y$ as the components of the straight line distance d between the host vehicle 101 and the target 200 in the coordinate system. That is, the distance d defines a relative heading angle θ that the computer 105 can use to determine the distances $d_x$, $d_y$:

$$d_x = d\sin(\theta) \quad (1)$$

$$d_y = d\cos(\theta) \quad (2)$$

The computer 105 can determine a speed $v_h$ of the host vehicle 101, a relative lateral speed $v_x$ of the target 200, and a relative longitudinal speed $v_y$ of the target 200. The speed $v_h$ of the host vehicle 101 is a longitudinal speed, i.e., a change in distance along the longitudinal axis y. Th relative lateral speed $v_x$ of the target 200 is a relative speed along the lateral axis x between the target 200 and the host vehicle 101. The relative longitudinal speed $v_y$ is a relative speed along the longitudinal axis y between the target 200 and the host vehicle 101.

The computer 105 can determine an acceleration $a_h$ of the host vehicle 101, a relative lateral acceleration $a_x$ of the target 200, and a relative longitudinal acceleration $a_y$ of the target 200. The acceleration $a_h$ of the host vehicle 101 is a longitudinal acceleration, i.e., a change in speed along the longitudinal axis y. The relative lateral acceleration $a_x$ of the target 200 is a relative acceleration along the lateral axis x between the target 200 and the host vehicle 101. The relative longitudinal acceleration $a_y$ is a relative acceleration along the longitudinal axis y between the target 200 and the host vehicle 101.

The computer 105 can determine a yaw rate $\omega_h$ of the host vehicle 101. The yaw rate $\omega_h$ is a change in a heading angle φ of the host vehicle 101, i.e., an angle between forward motion of the host vehicle 101 and the longitudinal axis y. When the yaw rate $\omega_h$ is nonzero, the host vehicle 101 turns. The computer 105 can predict a heading angle φ of the host vehicle 101 at a time t based on a constant yaw rate $\omega_h$: $\varphi(t) = \omega_h t$.

Figure 3:
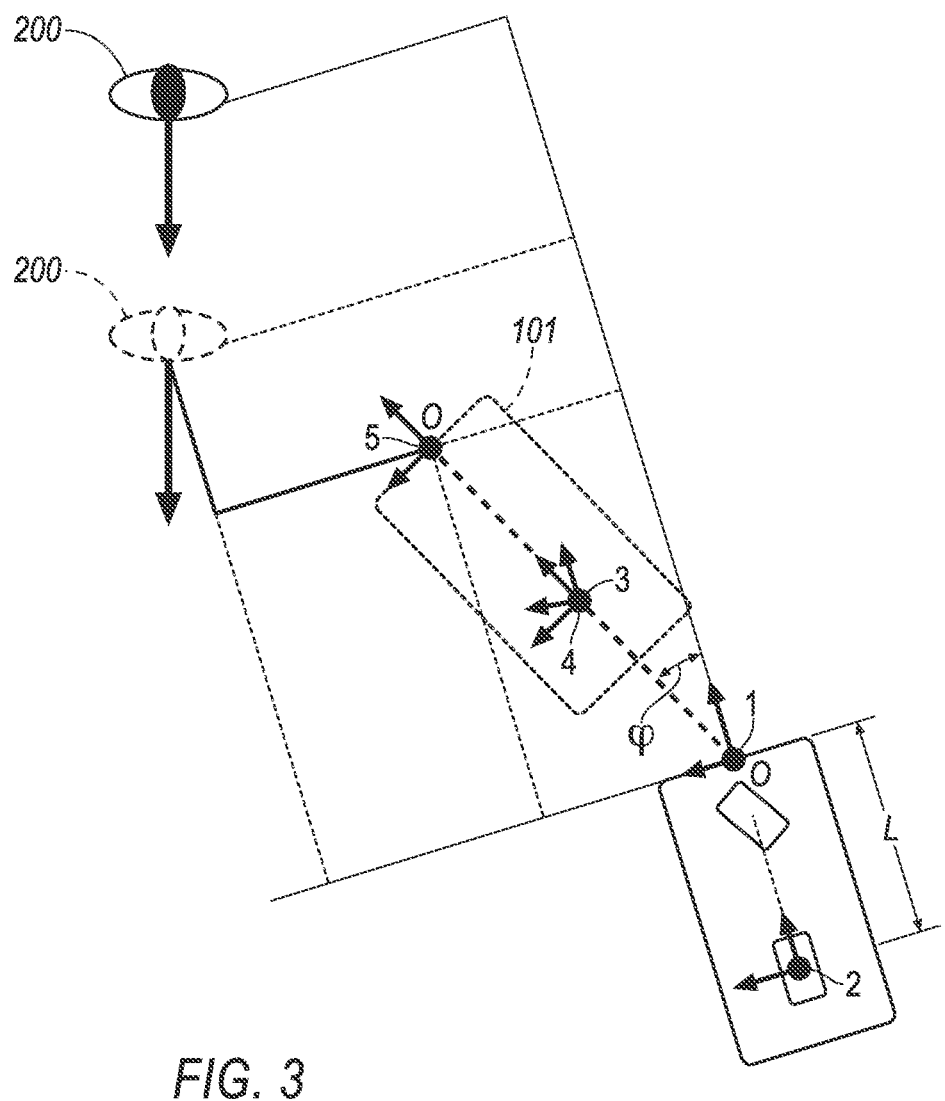
FIG. 3 is a plan view of the host vehicle in a turn.

FIG. 3 is a plan view of the host vehicle 101 in a turn. The computer 105 can predict the position of the host vehicle 101 and the target 200 at a time t during the turn. The time t is a predetermined amount of time from (i.e., elapsing since) the initiation of the turn at which the computer 105 can predict whether the host vehicle 101 will collide with the target 200.

The host vehicle 101 defines a rotated coordinate system at the time t. That is, as the host vehicle 101 rotates in the turn, the origin O of the vehicle coordinate system moves, and the coordinate system rotates relative to the coordinate system at the initiation of the turn. Thus, the lateral distance $d_x$ and the longitudinal distance $d_y$ between the host vehicle 101 and the target 200 can change as the lateral axis x and the longitudinal axis y rotate during the turn. As described below, the computer 105 can perform a threat assessment based on a prediction of respective positions of the host vehicle 101 and the target 200.

The computer 105 can identify a plurality of points at which to predict lateral and longitudinal distances between the host vehicle 101 and the target 200. In the example of FIG. 3, the computer 105 identifies five points, labeled 1-5. That is, the computer 105 can determine the threat assessment based on a predicted lateral offset between the target 200 and the center point of the front bumper of the host vehicle 101, as described below, at the time t in the rotated coordinate system, labeled as point 5. To predict the lateral offset at the center point of the front bumper at the time t, the computer 105 can identify the center point of the front bumper at the initiation of the turn, labeled as point 1, the center point of the rear axle at the initiation of the turn, labeled as point 2, the center point of the rear axle at the time t in the original coordinate system, labeled as point 3, and the center point of the rear axle at the time t in the rotated coordinate system, labeled as point 4. That is, because the propulsion rotates the rear axle to propel the host vehicle 101, the speed measurement at the rear axle is more accurate than a speed measurement of the front bumper. Thus, predicting motion of the host vehicle 101 based on motion of the rear axle can provide a more accurate prediction of the host vehicle 101 in the turn than predicting the motion based on the front bumper alone.

The computer 105 can identify a first point as the center point of the front bumper of the host vehicle 101, labeled as point 1 in FIG. 3. The computer 105 can determine a lateral position $x_h$ and a longitudinal position $y_h$ of the first point as a function of time t with a kinematic model such as a constant yaw rate and acceleration (CTRA) model:

$$x_h(t) = \frac{a_h \sin(\omega_h t) - \omega_h \cos(\omega_h t)(a_h t + v_{h,0})}{\omega_h^2} \quad (3)$$

$$y_h(t) = \frac{\omega_h \sin(\omega_h t)(a_h t + v_{h,0}) + a_h \cos(\omega_h t)}{\omega_h^2} \quad (4)$$

where $v_{h,0}$ is the speed of the host vehicle 101 at the initiation of the turn. The computer 105 can determine the relative lateral distance $d_{x,1}$ and the relative longitudinal distance $d_{y,1}$ as the initial lateral and longitudinal distances between the first point and a point on the target 200, e.g., a center point of a front bumper of a target 200, a closest point on a pedestrian target 200, etc. The computer 105 can determine the relative distances $d_{x,1}$, $d_{y,1}$ according to data 115 from one or more sensors 110, as described above and shown in FIG. 2. The subscript "1" in this example indicates the first point, and other numerical subscripts described below refer to their respective identified points. For the first point, the time t=0.

The computer 105 can identify a second point as the center point of the rear axle of the host vehicle 101 at the initiation of the turn, labeled as point 2 in FIG. 3. The distance between the first point and the second point is a predetermined distance L based on the dimensions of the host vehicle 101 and stored in the data store 106 and/or the server 130. That is, the rear axle does not move relative to the front bumper, so the distance L between the front bumper and the rear axle is a constant value. The computer 105 can determine the lateral position $x_2$, the longitudinal position $y_2$, the lateral distance $d_{x,2}$ and the longitudinal distance $d_{y,2}$ between the second point and the target 200:

$$x_2 = x_1 \quad (5)$$

$$y_2 = y_1 - L \quad (6)$$

$$d_{x,2}(t) = d_{x,1}(t) \quad (7)$$

$$d_{y,2}(t) = d_{y,1}(t) + L \quad (8)$$

That is, the relative lateral distance $d_{x,2}$ does not change and the relative longitudinal distance $d_{y,2}$ is adjusted by the distance L between the front bumper and the rear axle of the host vehicle 101. For the second point, the time t=0.

The computer 105 can identify a third point as the predicted center point of the rear axle at the time t during the turn in the coordinate system defined at the initiation of the turn, labeled as point 3 in FIG. 3. That is, the third point is the predicted position of the center point of the rear axle during the turn using the coordinate system defined at the initiation of the turn. The computer 105 can identify the third point with the equations above describing the CTRA model for the predicted time t.

The computer 105 can predict a lateral distance $d_{x,3}$ and a longitudinal distance $d_{y,3}$ between the third point and the target 200 at the time t. The computer 105 can predict the lateral position $x_{tg}$ and the longitudinal position $y_{tg}$ of the target 200 at the time t with a constant acceleration (CA) kinematic model:

$$x_{tg}(t) = 1/2 a_x^2 t^2 + v_x^2 t + x_2 \quad (9)$$

$$y_{tg}(t) = 1/2 a_y^2 t^2 + v_y^2 t + y_2 \quad (10)$$

The computer 105 can predict the lateral distance $d_{x,3}$ and the longitudinal distance $d_{y,3}$ based on the above Equations:

$$d_{x,3}(t) = x_{tg}(t) - x_h(t) \quad (11)$$

$$d_{y,3}(t) = y_{tg}(t) - y_h(t) \quad (12)$$

The computer 105 can identify a fourth point as the predicted center point of the rear axle at the time t in a coordinate system rotated according to a predicted heading angle φ of the host vehicle 101, as described above, labeled as point 4. During the turn, the coordinate system centered at the center point of the front bumper rotates according to the yaw rate $\omega_h$ of the host vehicle 101. The computer 105 can transform the lateral distance $d_{x,3}$ and the longitudinal distance $d_{y,3}$ in the original coordinate system to a lateral distance $d_{x,4}$ and a longitudinal distance $d_{y,4}$ in the rotated coordinate system at the time t, written as matrix multiplication for brevity and clarity:

$$[d_{x,4}(t), d_{y,4}(t)] = [d_{x,3}(t), d_{y,3}(t)] \begin{bmatrix} \cos(\omega_h t) & \sin(\omega_h t) \\ -\sin(\omega_h t) & \cos(\omega_h t) \end{bmatrix} \quad (13)$$

The computer 105 can identify a fifth point as the predicted center point of the front bumper at the time t in the rotated coordinate system, labeled as point 5. As described above, the front bumper is offset from the rear axle by the distance L. The computer 105 can determine a final lateral distance $d_{x,5}$ and a final longitudinal distance $d_{y,5}$ based on the distance L:

$$d_{x,5}(t) = d_{x,4}(t) \quad (14)$$

$$d_{y,5}(t) = d_{y,4}(t) - L \quad (15)$$

Combining equations 1-13 above, the computer 105 can determine the final lateral distance $d_{x,5}$ and the final longitudinal distance $d_{y,5}$ as functions of the time t:

$$d_{x,5}(t) = [t^2 \ t \ 1] \begin{bmatrix} \dfrac{a_x \sin(\omega_h t) + a_y \cos(\omega_h t)}{2} \\ \cos(\omega_h t) v_y + \sin(\omega_h t) v_x \\ \dfrac{(x_2 \omega_h^2 - v_h \omega_h) \sin(\omega_h t) + (a_h - y_2 \omega_h^2) \cos(\omega_h t) - a_h}{\omega_h^2} \end{bmatrix} \quad (16)$$

$$d_{y,5}(t) = [t^2 \ t \ 1] \begin{bmatrix} \dfrac{a_x \cos(\omega_h t) - a_y \sin(\omega_h t)}{2} \\ \dfrac{a_h}{\omega_h} + \cos(\omega_h t) v_x + \sin(\omega_h t) v_y \\ \dfrac{(y_2 \omega_h^2 - a_h) \sin(\omega_h t) + (v_h \omega_h - x_2 \omega_h^2) \cos(\omega_h t) - v_h \omega_h}{\omega_h^2} \end{bmatrix} \quad (17)$$

The computer 105 can predict a lateral time to collision $TTC_{lat}$ and a longitudinal time to collision $TTC_{long}$ as the respective times t at which the relative lateral distance $d_{x,5}$ and the relative longitudinal distance $d_{y,5}$ is zero:

$$d_{x,5}(TTC_{lat}) = 0 \quad (18)$$

$$d_{y,5}(TTC_{long}) = 0 \quad (19)$$

To determine the times to collision, the computer 105 can approximate the trigonometric functions described above as Taylor expansions. The computer 105 can further reduce the equations to a fourth-order polynomial to predict the longitudinal time to collision $TTC_{long}$:

$$d_{y,5}(t) = \begin{bmatrix} t^4 \\ t^3 \\ t^2 \\ t \\ 1 \end{bmatrix}^T \begin{bmatrix} \frac{\omega^2(\omega^2 d_{y,1} - 6a_y - 4\omega_h v_x + a_h)}{24} \\ \frac{\omega_h(-3\omega_h v_y + 3a_x - \omega_h^2 d_{x,1} + \omega_h v_h)}{6} \\ \frac{a_y - \omega_h^2 d_{y,1} + 2v_x \omega_h - a_h}{2} \\ v_y + d_{x,1}\omega_h - v_h \\ d_{y,1} - L \end{bmatrix} \quad (20)$$

The computer 105 can determine a lateral offset $L_{lat}$ as the lateral distance $d_{x,5}$ at the longitudinal time to collision $TTC_{long}$:

$$L_{lat} = d_{x,5}(TTC_{long}) \quad (21)$$

That is, the lateral offset $L_{lat}$ is the lateral distance between the center point of the front bumper of the host vehicle 101 and the target 200 in the rotated coordinate system at the longitudinal time to collision $TTC_{long}$.

The computer 105 can perform a threat assessment. The threat assessment can be a brake threat number BTN or a steering threat number STN. The brake threat number BTN is a needed deceleration to slow or stop the host vehicle 101 to allow the target 200 to pass the host vehicle 101. The computer 105 can determine a brake threat number BTN according to two calculations: one based on the velocity $v_{tg}$ of the target 200 (herein referred to as $BTN_{host}$) and one based on a longitudinal safety margin LSM (herein referred to as $BTN_{dis}$).

The computer 105 can determine the brake threat numbers $BTN_{host}$, $BTN_{dis}$ based on a brake delay time $T_{brake}$. The "brake delay time" is a time $T_{brake}$ is an elapsed time between when the computer 105 sends an instruction to a brake to decelerate and then the host vehicle 101 begins to decelerate, i.e., the actuation time of a brake of the host vehicle 101. For example, the brake delay time $T_{brake}$ can be a time for a brake pump to provide brake fluid to one or more brake pads of a hydraulic brake as specified by a manufacturer or measured from empirical testing of brakes 120 of vehicles 101, 200. The brake delay time $T_{brake}$ can vary based on a host vehicle 101 speed $V_h$, e.g., higher speeds $v_h$ may require additional time for brake of the host vehicle 101 to actuate. That is, the brake delay time $T_{brake}(v_h)$ can be a function of the speed $v_h$ of the host vehicle 101. The brake delay time $T_{brake}$ is stored in the data store 106 and/or the server 130 in a lookup table or the like, such as Table 1 below:

TABLE 1

| $v_h$ (kph) | 10 | 15 | 20 | 25 | 30 |
|---|---|---|---|---|---|
| $T_{brake}$ (sec) | 0.53 | 0.55 | 0.60 | 0.65 | 0.70 |

The computer 105 can determine the brake threat number $BTN_{host}$ based on the brake delay time $T_{brake}$:

$$BTN_{host}(t) = \min\left(\frac{v_{tg}(t)}{TTC_{long}(t) - T_{brake}(v_h)} * \frac{1}{decel_h^{max}}, 1\right) \quad (22)$$

where $decel_h^{max}$ is a maximum deceleration of the host vehicle 101 and $v_{tg}(t)$ is the predicted speed of the target 200 at the time t. The computer 105 can determine the maximum deceleration of the host vehicle 101 $decel_h^{max}$ based on manufacturer specifications and/or empirical brake testing of vehicles 101, 200. The maximum deceleration $decel_h^{max}$ is stored in the data store 106 and/or the server 130.

The computer 105 can determine the brake threat number $BTN_{dis}$ based on the difference between the longitudinal distance $d_{y,5}$ and the longitudinal safety margin LSM, a longitudinal distance threshold. When $(d_{y,5}(t)-LSM(t))>0$:

$$BTN_{dis}(t) = \min\left(\frac{2*(d_{y,5}(t) - LSM(t))}{TTC_{long}(t) - T_{brake}(v_h)} * \frac{1}{decel_h^{max}}, 1\right) \quad (23)$$

When $(d_{y,5}(t)-LSM(t)) \leq 0$, $BTN_{dis}(t)=1$. The computer 105 can determine the longitudinal safety margin LSM based on the longitudinal time to collision $TTC_{long}$:

$$LSM(TTC_{long}(t)) = \frac{a}{2}\left(\frac{(b - TTC_{long}(t))}{\sqrt{(b - TTC_{long}(t))^2 + c^2}} + 1\right) \quad (24)$$

where a, b, c are tunable parameters that can be determined based on empirical testing of vehicles 101 and targets 200 in collisions.

The computer 105 can determine a steering threat number STN. The steering threat number STN is a measure of a lateral acceleration to steer the host vehicle 101 away from a path of the target vehicle 200 in a direction opposite the turning direction of the host vehicle 101. The computer 105 can determine the steering threat number STN based on a sign of the yaw rate ω of the host vehicle 101 and a sign of the predicted lateral offset $L_{lat}$:

$$STN = \max\left(2 * \frac{x_{margin} + F_{sign} \cdot |L_{lat}|}{(TTC_{long} - T_{SteerDelay})^2} * \frac{1}{a_{h,lat,max}}, 1\right) \quad (25)$$

where $x_{margin}$ is a lateral safety margin based on empirical testing of host vehicle 101 in intersections with target vehicles 200, $TTC_{long}$ is the longitudinal time to collision, as described above, $T_{SteerDelay}$ is an actuation time of a steering component 120, $a_{h,lat,max}$ is a maximum lateral acceleration of the host vehicle 101, and $F_{sign}$ is a factor that is either 1 or -1 depending on the signs of the yaw rate $\omega_h$ and the predicted lateral offset $L_{lat}$:

$$F_{sign} = \begin{cases} 1 & \omega_h > 0, \; L_{lat} \geq 0 \\ 1 & \omega_h < 0, \; L_{lat} \leq 0 \\ -1 & \omega_h > 0, \; L_{lat} < 0 \\ -1 & \omega_h < 0, \; L_{lat} > 0 \end{cases} \quad (26)$$

That is, the steering threat number STN is a lateral acceleration of the host vehicle 101 based on the predicted lateral offset $L_{lat}$ adjusted by an actuation time $T_{SteerDelay}$ of a steering component 120. By including for the actuation time $T_{SteerDelay}$ of the steering component 120, the computer 105 more accurately predicts the time necessary to perform steering.

The actuation time $T_{SteerDelay}$ of the steering component 120 is an elapsed time between when the computer 105 instructs the steering component 120 to steer the host vehicle 101 and the host vehicle 101 begins to turn as specified by a manufacturer and/or measured in empirical testing of steering components 120 of vehicles 101, 200. For example, the actuation time $T_{SteerDelay}$ can be a time for a steering motor to power up and move a steering rack to steer the host vehicle 101. The actuation time $T_{SteerDelay}$ is stored in the data store 106 and/or the server 130.

The computer 105 can determine an overall threat number TN. The overall threat number TN is the minimum of the brake threat numbers $BTN_{host}$, $BTN_{dis}$ and the steering threat number STN. That is, lower threat numbers indicate less actuation of components 120 to avoid the target 200. For example, if the brake threat number $BTN_{host}$ is less than the steering threat number STN, the computer 105 can actuate the brake 120 to provide braking force that is less than the steering force required by the steering component 120 to steer the host vehicle 101 away from the target vehicle 200. That is, the computer 105 advantageously performs fewer actuations of components 120 to provide the same collision avoidance according to the minimum threat number TN.

The computer 105 can adjust the threat number TN based on the predicted lateral offset $L_{lat}$ and the longitudinal time to collision $TTC_{long}$. The target 200 may require less or no collision mitigation if the target 200 is not likely to collide with the host vehicle 101. To reduce false positive identifications of threats to the host vehicle 101, the computer 105 can adjust the threat assessment by a shift factor $f_{adj}$, which is a dimensionless value between 0 and 1 multiplied to the threat number TN. Upon determining the threat number TN, the computer 105 can determine whether the predicted time to collision $TTC_{long}$ is below a time threshold $TTC_{th}$. The time threshold $TTC_{th}$ is a tunable, empirically determined threshold based on the host vehicle 101 speed $v_h$:

TABLE 2

| $v_h$ (kph)    | 10   | 15   | 20   | 30   |
|----------------|------|------|------|------|
| $TTC_{th}$ (sec) | 1.30 | 1.20 | 1.10 | 0.95 |

If the longitudinal time to collision $TTC_{long}$ exceeds the time threshold $TTC_{th}$, the computer 105 can determine that the host vehicle 101 is not likely to collide with the target 200 and can set the shift factor $f_{adj}$=0. That is, the computer 105 would not perform collision mitigation for the target 200 until collecting more data 115 and determining a successive longitudinal time to collision $TTC_{long}$.

If the longitudinal time to collision $TTC_{long}$ is below the time threshold $TTC_{th}$, the computer 105 can compare the lateral offset $L_{lat}$ to a width of the host vehicle 101 $W_h$ to determine whether, at the time to collision $TTC_{long}$, the target 200 is predicted to collide with the host vehicle 101. That is, if the lateral offset $L_{lat}$ is less than half the width of the host vehicle 101

$$\left(L_{lat}(t) \le \frac{W_h}{2}\right),$$

then the target 200 is predicted to be within the path of the host vehicle 101, i.e., the host vehicle 101 would have collided with the target 200 already at the time t. The computer 105 can set the shift factor $f_{adj}$=1 if the lateral offset $L_{lat}$ is less than half the width of the host vehicle 101.

If the lateral offset $L_{lat}$ is greater than half the width of the host vehicle 101, the computer can determine the shift factor $f_{adj}$ according to the lateral offset $L_{lat}$:

$$f_{adj}(t) = e^{-\frac{L_{lat}^2(t)}{2\sigma^2}} \tag{27}$$

$$\sigma = k\left(\frac{W_h}{2} + SM(t)\right) \tag{28}$$

$$SM(TTC_{long}(t)) = \frac{A}{2}\left(\frac{(B - TTC_{long}(t))}{\sqrt{(C - TTC_{long}(t))^2 + C^2}} + 1\right) \tag{29}$$

where σ is a distance factor that accounts for the width $W_h$ of the host vehicle 101 offset by an empirically tunable safety factor k and a safety margin SM that is determined with empirically tunable factors A, B, C based on empirical testing of vehicles 101 and targets 200. That is, as the lateral offset $L_{lat}$ increases, the shift factor $f_{adj}$ decreases, indicating that the target 200 is less likely to enter into the path of the host vehicle 101. Thus, the final threat number TN is $$TN = f_{adj} \cdot \min(BTN_{host}, BTN_{dis}, STN) \tag{30}$$

The computer 105 can actuate one or more vehicle components 120 based on the threat number TN, e.g., when the threat number TN is above a predetermined threat number threshold. The computer 105 can actuate one or more components 120 based on a comparison of the threat number to a plurality of thresholds. The thresholds can be determined as, e.g., specifications from a manufacturer, results of simulation testing of virtual host vehicle 101 and virtual target 200 trajectories, empirical testing of vehicle components 120 of the host vehicle 101 during a collision test, etc. The simulation testing can include a plurality of repetitions of a virtual host vehicle 101 turning into a trajectory of a virtual target 200 for a plurality of specified yaw rates of the virtual host vehicle 101 and a plurality of specified trajectories of the virtual target 200. The simulation testing can output predicted threat numbers TN, acceleration data 115, speed data 115, and position data 115 for each virtual host vehicle 101. Based on the output data 115, the manufacturer can specify the thresholds and specific actuation of components 120 according to the thresholds. For example, if the threat number TN is above 0.7, the computer 105 can actuate a brake 120 to decelerate the host vehicle 101, e.g., at −6.5 meters per second squared (m/s²). In another example, if the threat number TN is above 0.4 but less than or equal to 0.7, the computer 105 can actuate the brake 120 to, e.g., a deceleration of −2.0 m/s². In another example, if the threat number TN is greater than 0.2 but less than or equal to 0.4, the computer 105 can display a visual warning on a host vehicle 101 human-machine interface and/or play an audio warning over a speaker.

Figure 4:
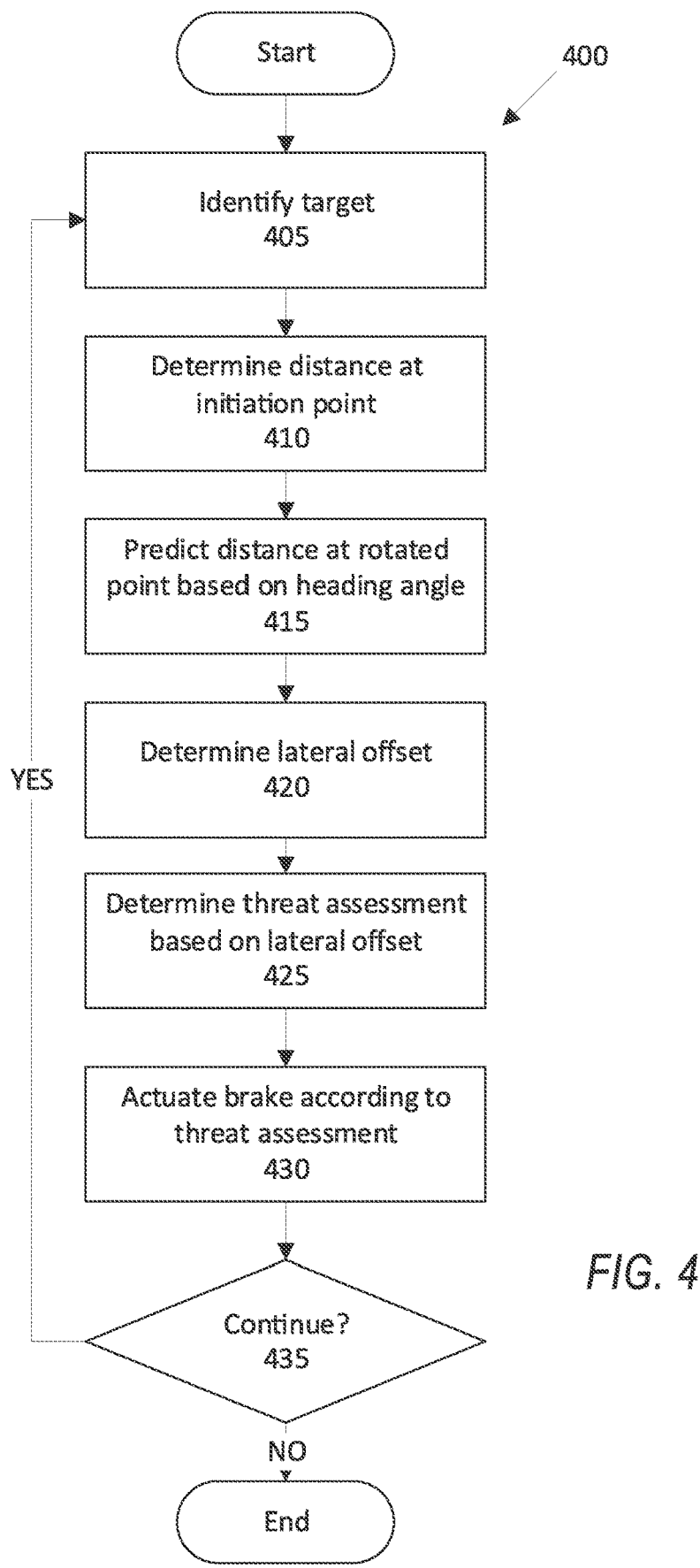
FIG. 4 is a block diagram of an example process for collision mitigation.

FIG. 4 is a block diagram of an example process 400 for collision mitigation. The process 400 begins in a block 405, in which a computer 105 of a host vehicle 101 identifies a target 200. The computer 105 can actuate one or more sensors 110 to collect data 115 about the target 200. For example, the computer 105 can determine a position, speed, and acceleration of the target 200 based on image data 115 collected from one or more cameras 110 and an image-processing algorithm such as Canny edge detection.

Next, in a block 410, the computer 105 determines the distance between the host vehicle 101 and the target 200 at an initiation point of a turn. The computer 105 can determine relative lateral and longitudinal distances $d_x$, $d_y$ between the host vehicle 101 and the target 200, as described above.

Next, in a block 415, the computer 105 predicts a distance between the host vehicle 101 and the target 200 based on a predicted heading angle $\varphi = \omega_h t$ of the host vehicle 101 at a specified time after initiation of the turn. As the host vehicle 101 turns, the heading angle φ of the host vehicle 101 changes according to the yaw rate $\omega_h$, and a vehicle coordinate system rotates according to the predicted heading angle φ. The computer 105 can predict the distance between the host vehicle 101 and the target 200 in the rotated coordinate system, as described above. For example, the computer 105 can predict the distance between a center point of a front bumper of the host vehicle 101 and a point on the target 200 by determining respective lateral and longitudinal distances between the target 200 and five points of the host vehicle 101, including the center of the rear axle of the host vehicle 101 at the initiation of the turn and the center of the rear axle of the host vehicle 101 at a time t during the turn.

Next, in a block 420, the computer 105 determines a lateral offset $L_{lat}$ between the host vehicle 101 and the target 200 at a longitudinal time to collision $TTC_{long}$. As described above, the lateral offset $L_{lat}$ is the lateral distance between the host vehicle 101 and the target 200 when the predicted longitudinal distance between the host vehicle 101 and the target 200 reaches zero. The computer 105 can determine the lateral offset $L_{lat}$ based on the distance between the host vehicle 101 and the target 200 in the rotated coordinate system.

Next, in a block 425, the computer 105 determines a threat assessment based on the lateral offset. As described above, the threat assessment can be a brake threat number $BTN_{host}$, $BTN_{dis}$ and/or a steering threat number STN. The computer 105 can determine the threat assessment as the lowest determined threat number. The computer 105 can adjust the threat number according to the longitudinal time to collision $TTC_{long}$, as described above.

Next, in a block 430, the computer 105 actuates a brake 120 according to the threat assessment. As described above, the computer 105 can actuate the brake 120 the slow the host vehicle 101 until the target 200 passes the host vehicle 101. The computer 105 can actuate the brake 120 according to the value of the threat number TN, as described above.

Next, in a block 435, the computer 105 determines whether to continue the process 400. For example, the computer 105 can determine not to continue the process 400 upon completing the turn. If the computer 105 determines to continue, the process 400 returns to the block 405. Otherwise the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   identify an initial lateral distance and an initial longitudinal distance between a host vehicle and a target in a turn at an initiation of the turn, the initial lateral distance being measured laterally relative to the host vehicle at the initiation of the turn and the initial longitudinal distance being measured longitudinally relative to the host vehicle at the initiation of the turn;

predict a heading angle of the host vehicle at a specified time after the initiation of the turn;

predict a final lateral distance and a final longitudinal distance between the host vehicle and the target at the specified time based on the identified lateral distance, the identified longitudinal position, and the predicted heading angle, the final lateral distance being measured laterally relative to the host vehicle at the specified time and the final longitudinal distance being measured longitudinally relative to the host vehicle at the specified time;

determine a lateral offset between the host vehicle and the target at a longitudinal time to collision based on the final lateral distance and the final longitudinal distance, the longitudinal time to collision being after the specified time; and actuate a brake of the host vehicle according to a threat assessment based on the lateral offset.

2. The system of claim 1, wherein the instructions further include instructions to determine the threat assessment based on a brake delay time of the brake of the host vehicle.

3. The system of claim 1, wherein the instructions further include instructions to determine a second threat assessment based on a target speed and to actuate the brake according to the lower of the threat assessment and the second threat assessment.

4. The system of claim 1, wherein the instructions further include instructions to adjust the threat assessment based on the lateral offset when the longitudinal time to collision is below a time threshold.

5. The system of claim 4, wherein the instructions further include instructions to adjust the threat assessment based on the lateral offset and the longitudinal time to collision.

6. The system of claim 1, wherein the initial lateral distance and the initial longitudinal distance of the host vehicle is a lateral distance and a longitudinal distance between a center point of a front bumper of the host vehicle and the target, and the instructions further include instructions to identify a second lateral distance between a center point of a rear axle of the host vehicle and the target and a second longitudinal distance between the center point of the rear axle of the host vehicle and the target based on the lateral distance and the longitudinal distance of the center point of the front bumper of the host vehicle.

7. The system of claim 6, wherein the instructions further include instructions to predict a third lateral distance between the center point of the rear axle and the target at the specified time and a third longitudinal distance between the center point of the rear axle and the target at the specified time based on the second lateral distance and the second longitudinal distance.

8. The system of claim 7, wherein the instructions further include instructions to predict a fourth lateral distance between the center point of the rear axle and the target and a fourth longitudinal distance between the center point of the rear axle and the target based on the predicted heading angle, the third lateral distance, and the third longitudinal distance.

9. The system of claim 8, wherein the instructions further include instructions to predict the final lateral distance based on the fourth lateral distance and the final longitudinal distance based on the fourth longitudinal distance.

10. The system of claim 1, wherein the instructions further include instructions to adjust the threat assessment based on the lateral offset and a width of the host vehicle.

11. The system of claim 1, wherein the instructions further include instructions to suppress the threat assessment when the longitudinal time to collision exceeds a time threshold.

12. The system of claim 1, wherein the instructions further include instructions to determine the final lateral distance and the final longitudinal distance in a vehicle coordinate system rotated by the predicted heading angle.

13. The system of claim 1, wherein the instructions further include instructions to predict the heading angle of the host vehicle based on a yaw rate of the host vehicle.

14. The system of claim 1, wherein the predicted heading angle is an angle defined between a longitudinal axis of a vehicle coordinate system at the initiation of the turn and a longitudinal axis of a second vehicle coordinate system at the specified time.

15. A method, comprising:
identifying an initial lateral distance and an initial longitudinal distance between a host vehicle and a target in a turn at an initiation of the turn, the initial lateral distance being measured laterally relative to the host vehicle at the initiation of the turn and the initial longitudinal distance being measured longitudinally relative to the host vehicle at the initiation of the turn;

predicting a heading angle of the host vehicle at a specified time after the initiation of the turn;

predicting a final lateral distance and a final longitudinal distance between the host vehicle and the target at the specified time based on the identified lateral distance, the identified longitudinal position, and the predicted heading angle, the final lateral distance being measured laterally relative to the host vehicle at the specified time and the final longitudinal distance being measured longitudinally relative to the host vehicle at the specified time;

determining a lateral offset between the host vehicle and the target at a longitudinal time to collision based on the final lateral distance and the final longitudinal distance, the longitudinal time to collision being after the specified time; and actuating a brake of the host vehicle according to a threat assessment based on the lateral offset.

16. The method of claim 15, further comprising determining the threat assessment based on a brake delay time of the brake of the host vehicle.

17. The method of claim 15, further comprising determining a second threat assessment based on a target speed and to actuate the brake according to the lower of the threat assessment and the second threat assessment.

18. The method of claim 15, further comprising adjusting the threat assessment based on the lateral offset when the longitudinal time to collision is below a time threshold.

19. The method of claim 15, further comprising suppressing the threat assessment when the longitudinal time to collision exceeds a time threshold.

20. The method of claim 15, further comprising determining the final lateral distance and the final longitudinal distance in a vehicle coordinate system rotated by the predicted heading angle.

* * * * *